United States Patent [19]

Schwab et al.

[11] Patent Number: 5,134,496
[45] Date of Patent: Jul. 28, 1992

[54] BILATERAL ANTI-COPYING DEVICE FOR VIDEO SYSTEMS

[75] Inventors: Barry H. Schwab, Bloomfield; James W. Hussey, Canton, both of Mich.

[73] Assignee: Technicolor Videocassette of Michigan Inc., Livonia, Mich.

[21] Appl. No.: 358,576

[22] Filed: May 26, 1989

[51] Int. Cl.⁵ .................................. H04N 5/76
[52] U.S. Cl. ........................ 358/335; 380/5; 360/60
[58] Field of Search ............ 358/310, 319, 335; 360/60, 24, 33.1; 380/5, 20

[56] References Cited

U.S. PATENT DOCUMENTS

| | | | |
|---|---|---|---|
| 3,963,865 | 6/1976 | Songer | 178/7.1 |
| 4,040,099 | 8/1977 | Cook | 360/29 |
| 4,100,575 | 7/1978 | Morio et al. | 358/120 |
| 4,163,253 | 7/1979 | Morio et al. | 358/120 |
| 4,185,305 | 1/1980 | Perret | 360/33 |
| 4,209,850 | 6/1980 | Tazaki | 365/189 |
| 4,213,149 | 7/1980 | Janko | 358/153 |
| 4,354,243 | 10/1982 | Ryan et al. | 364/515 |
| 4,360,747 | 11/1982 | Ryan | 307/511 |
| 4,404,499 | 9/1983 | Ryan | 315/371 |
| 4,475,129 | 10/1984 | Kagota | 358/310 |
| 4,488,176 | 12/1984 | Bond et al. | 358/319 |
| 4,488,183 | 12/1984 | Kinjo | 358/310 |
| 4,521,736 | 6/1985 | Ryan | 329/102 |
| 4,528,588 | 7/1985 | Lofberg | 358/122 |
| 4,540,919 | 9/1985 | Ryan | 315/384 |
| 4,550,350 | 10/1985 | Billings | 360/15 |
| 4,571,642 | 2/1986 | Hofstein | 380/5 |
| 4,600,942 | 7/1986 | Field et al. | 358/122 |
| 4,673,981 | 6/1987 | Lippman et al. | 358/160 |
| 4,775,901 | 10/1988 | Nakano | 360/60 |
| 4,777,537 | 10/1988 | Ueno et al. | 358/341 |
| 4,907,093 | 3/1990 | Ryan | 358/335 |
| 4,965,675 | 10/1990 | Hori et al. | 360/19.1 |
| 4,965,680 | 10/1990 | Endoh | 360/60 |

FOREIGN PATENT DOCUMENTS 202945A 11/1986 European Pat. Off. ............. 360/27
7703111 3/1977 Netherlands .

OTHER PUBLICATIONS

Data Conference Bulletin, Jul. 19,1985, pp. 1-2, 54, 18, 6, 13 and 16.

Primary Examiner—Robert L. Richardson
Assistant Examiner—Thai Tran
Attorney, Agent, or Firm—Lyon & Lyon

[57] ABSTRACT

A video system anti-copying device in which leading and trailing code sequences are inserted into the luminance portion of a video signal. These code sequences are visually manifested as dropouts on a video monitor. When the sequences match, operation of record circuitry in a video recorder is inhibited.

21 Claims, 5 Drawing Sheets

A = ASCII CHARACTER INFORMATION
C = ACT PHASE II CODE
LSB = LEAST SIGNIFICANT BIT
MSB = MOST SIGNIFICANT BIT

A = 8 BITS LEFT TO RIGHT: DB0→DB7
C = 16 BITS RIGHT TO LEFT: CB0→DB15
CB = CODE BIT POSITION "C"
DB = DATA BIT POSITION "N"
ASC II DB7 = EXTENDED CHARACTER SET: 1
ASC II DB7 = NORMAL CHARACTER SET: 0
I = CONTINUOUS IDENTIFICATION CODE

FIG. 4

BILATERAL ANTI-COPYING DEVICE FOR VIDEO SYSTEMS

BACKGROUND OF THE INVENTION

The field of the present invention is video systems, and more particularly, video tape recording systems. In its most immediate sense, the invention relates to home video cassette recorders.

It has long been recognized that "pirate" copying of copyrighted video materials has caused economic problems in the entertainment industry. This is because a studio knows that only a fraction of the total number of ultimate consumers of video software will actually purchase a copy for their own use. Instead, many consumers will secure a copy of a movie and then copy it onto a blank cassette tape without payment of any kind to the studio.

Because of such "pirate" copying, the studio must price each legal copy of the software at a comparatively expensive level. This is because the studio must recoup its costs and earn its profits on a relatively small number of copies. Consequently, the actual market for legitimate video software is effectively diminished.

The diminished market also adversely affects the makers of video equipment such as video tape players and recorders. This is because the relatively high price of legitimate copies acts as a disincentive to purchasing and renting them, and in turn acts as a disincentive to purchasing video tape players and records.

Accordingly, many anti-copying schemes have been developed to prevent recordation of video software. In most instances, these schemes are similar in concept to a system known in the prior art as Macrovision. In this system, the synchronization portion of the video signal is altered in a predetermined way so as to make it possible to play properly on a television, but not be recordable by conventional consumer videocassette recorders.

However, this system is unsatisfactory for both legal and technical reasons It is entirely legal for persons to sell equipment which has a legal function, and picture stabilization is a function which may be legally performed. For example, if a person wishes to sell a "black box" which is adapted to defeat Macrovision encoding, it is only necessary that the "black box" have an entirely legal purpose, such as picture stabilization. The "black box" may then be advertised as a picture stabilizer, which coincidently has the further capability of defeating Macrovision encoding. Consequently, manufacturers, sellers and users of such devices may legitimately claim that they are making selling and using such devices for a perfectly legitimate end, namely picture stabilization, and that the defeating of Macrovision encoding is only an ancillary and unintended result.

Furthermore, it is comparatively easy to manufacture a "black box" which will defeat a Macrovision-encoded video recording. This is because any system which alters the synchronization of the video picture can be reverse-engineered with relative ease, since the task of defeating such a system reduces to the task of providing appropriate synchronization signals and linking them to the luminance and chroma signals which are already provided.

Additionally, it is important for economic reasons that any anti-copying scheme produce an acceptable video image when an encoded tape is replayed on a conventional video tape player/recorder. This is because a studio would not have a sufficiently large market for any encoded video tape which could be replayed only on new video equipment and not on the large installed base of older video players and recorder/players which exists now and which will continue to exist for many years in the future.

SUMMARY OF THE INVENTION

The present invention is directed to an anti-copying system for video systems, and more particularly, video tape recording systems. In particular, the present invention is directed to a "bilateral" anti-copying system. The systems of the prior art, e.g. Copy Guard, Macrovision,etc., all use a "unilateral" system where the prerecorded cassettes are encoded but effective unauthorized prevention of duplication is diminished since current consumer video recorders do not contain standardized dedicated decoding circuitry. The present invention, in contrast, is a "bilateral" system in that it includes, in addition to an encoding method, dedicated decoding circuitry incorporated as an integral part of the record circuits of video recorders.

In accordance with the present invention, a conventionally-synchronized video signal is encoded in such a manner that the coding manifests itself as an acceptable video imperfection. In the preferred embodiment, the imperfection appears as a "dropout", i.e., an imperfectly colored line or portion of a line of the video signal. When a video signal from an encoded video tape is played on a conventional video player or player/recorder, the encoding produces a imperfection which is minor and highly transitory. In addition, the encoding is such that it is difficult for the viewer to perceive the imperfection, but relatively easy for electronic circuitry to detect it. As a result, a consumer will not object to purchasing or renting an encoded video tape.

In further accordance with the invention, leading and trailing code sequences are inserted into the video signal. The code sequences are in some way related to each other; in the preferred embodiment, the trailing code sequence is the inverse of the leading code sequence, but this is not necessary and any predetermined relationship (i.e., identicality, exchange of predetermined data items, etc.) may be used. In still further accordance with the invention, the video signal is electronically monitored during playback to detect the leading code sequence if that sequence is actually present. When the leading code sequence is detected during playback, the playback equipment continues to monitor the video signal, but the monitoring is now aimed at detecting the trailing code sequence. If the trailing code sequence is actually present, i.e., if the detected code sequences match as intended, this indicates that the video signal comes from an encoded video tape (or video disk, the medium being unimportant to the invention).

Upon such indication, a signal can be generated to interrupt the operation of the record circuitry. Ideally, the leading and trailing code sequences are inserted repeatedly into the video signal, and the record inhibit lasts only for a limited time. This has the advantage in that a random coincidence will cause only a single, limited interruption of recordation of a legally-recordable video signal, while copying of an encoded video tape will remain effectively precluded.

The leading and trailing code sequences are spaced apart from each other by a predetermined interval In the preferred embodiment, the leading and trailing code sequences are spaced apart by one video field. This serves to make the dropout less noticeable.

Accordingly, it is an object of the present invention to provide an anti-copying scheme which would not visibly degrade encoded video software when viewed using existing video playback equipment, even after many repeated playings.

It is a further object of the present invention to provide an anti-copying scheme which could be defeated only by circuitry which had no purpose other than to directly circumvent the anticopying scheme, with the result that such circuitry would have no legitimate purpose and whose sale would, therefore, be unlawful.

It is a further object of the present invention to provide an anti-copying scheme which did not rely on the alteration of video synchronization signals as a means of preventing copying.

It is a further object of the present invention to provide an anti-copying scheme which could not be easily defeated by electronic analysis of the video signal in the encoded software.

It is a further object of the present invention to provide a method of including identification data as part of a signal encoded within a normal video signal.

DETAILED DESCRIPTION OF PREFERRED EMBODIMENTS

Figure 1:
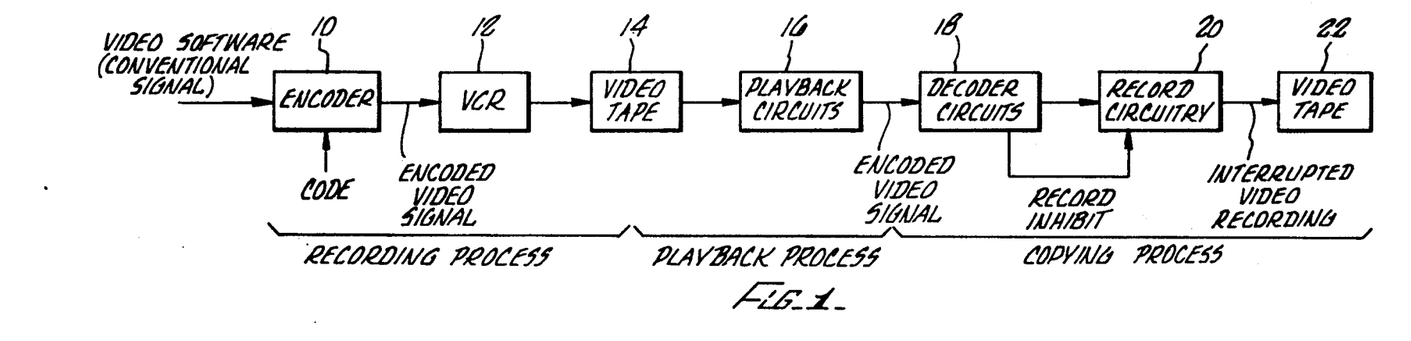
FIG. 1 is a block diagram illustrating how the invention is implemented.

In accordance with the invention, an otherwise completely conventional video signal is encoded by inserting leading and trailing code sequences into it before the signal is recorded on video tape (or other recordation medium, e.g. video disk, ec.). Turning to FIG. 1, a conventional signal representing the video software which is to be copy-protected is input to an encoder 10 (described in more detail below) which adds leading and trailing code sequences to the signal as is described below. This produces an encoded video signal which is, in a video recorder 12, recorded on the video tape 14. (Tape is now preferred because of the prevalence of this format, but the format is not part of the invention.)

When the tape 14 is subsequently played in a video recorder 12 or broadcast on the air over cable television networks, playback or transmission circuitry (as the case may be) 16 produces an encoded video signal which ideally is identical to the signal produced by the encoder 10. When this signal is input to a video recorder which is equipped with the preferred embodiment of the invention, a decoder circuit 18 (described in more detail below) generates a record inhibit signal to inhibit the operation of the record circuitry 20 in the video recorder. This record circuitry 20, when so inhibited, is incapable of recording the encoded video signal on another tape 22.

If the video recorder is not equipped with the preferred embodiment of the invention, the above-described decoder circuit 18 is absent. Accordingly, the encoded video signal is directly input to the record circuitry 20 and is subsequently recorded on the tape 22. Alternatively, if the video recorder is equipped with the preferred embodiment of the invention but is being used to record a video signal on which no encoding is present, the record inhibit signal is never generated and the record circuitry 20 records the signal on the tape 22 in a normal manner.

Thus, as is described below, the invention allows even copy-protected video software to be copied on video recorders which lack appropriate circuitry. While in its initial stages this does not stem appreciable revenue loss caused by illegal copying, the effects of the invention become much more pronounced as older video recorders are replaced by newer ones which are equipped with such circuitry. This permits studios and other producers of video software to immediately commence the encoding of their proprietary video software without losing market share.

In accordance with the invention, the encoded video signal, by itself, produces a video picture which is entirely acceptable when displayed on a television monitor. This is because, in the preferred embodiment, the encoding produces a "dropout", which is a commonly occurring visual effect. The encoding method itself will be described with reference to FIG. 2 and the implementation of this system in the preferred embodiment will next be described with reference to FIGS. 3 and 4.

Figure 2:
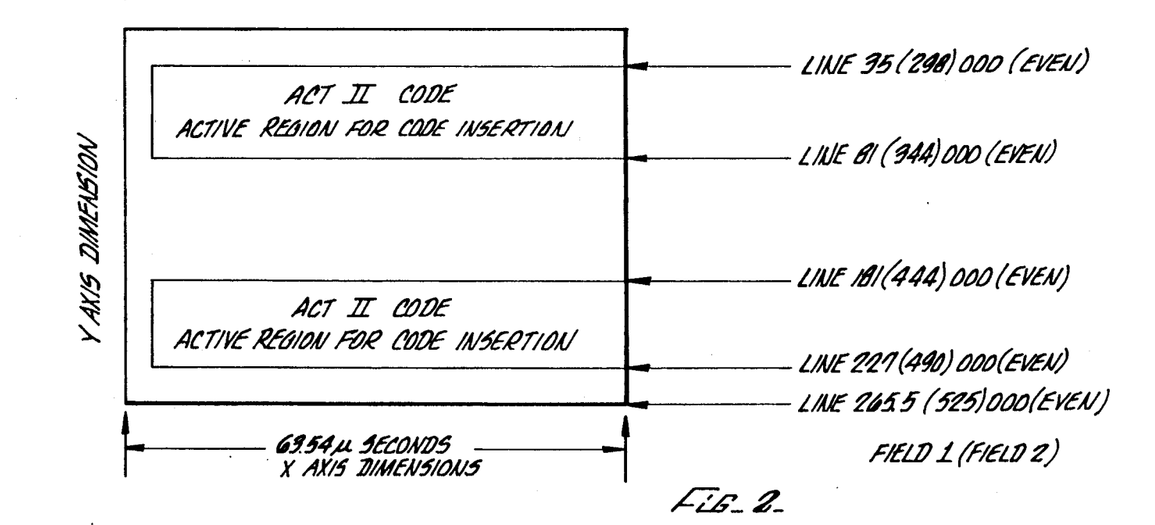
FIG. 2 is a schematic illustration showing where leading and trailing code sequences may be inserted into a video signal in accordance with the preferred embodiment.
Figures 3, 5C:
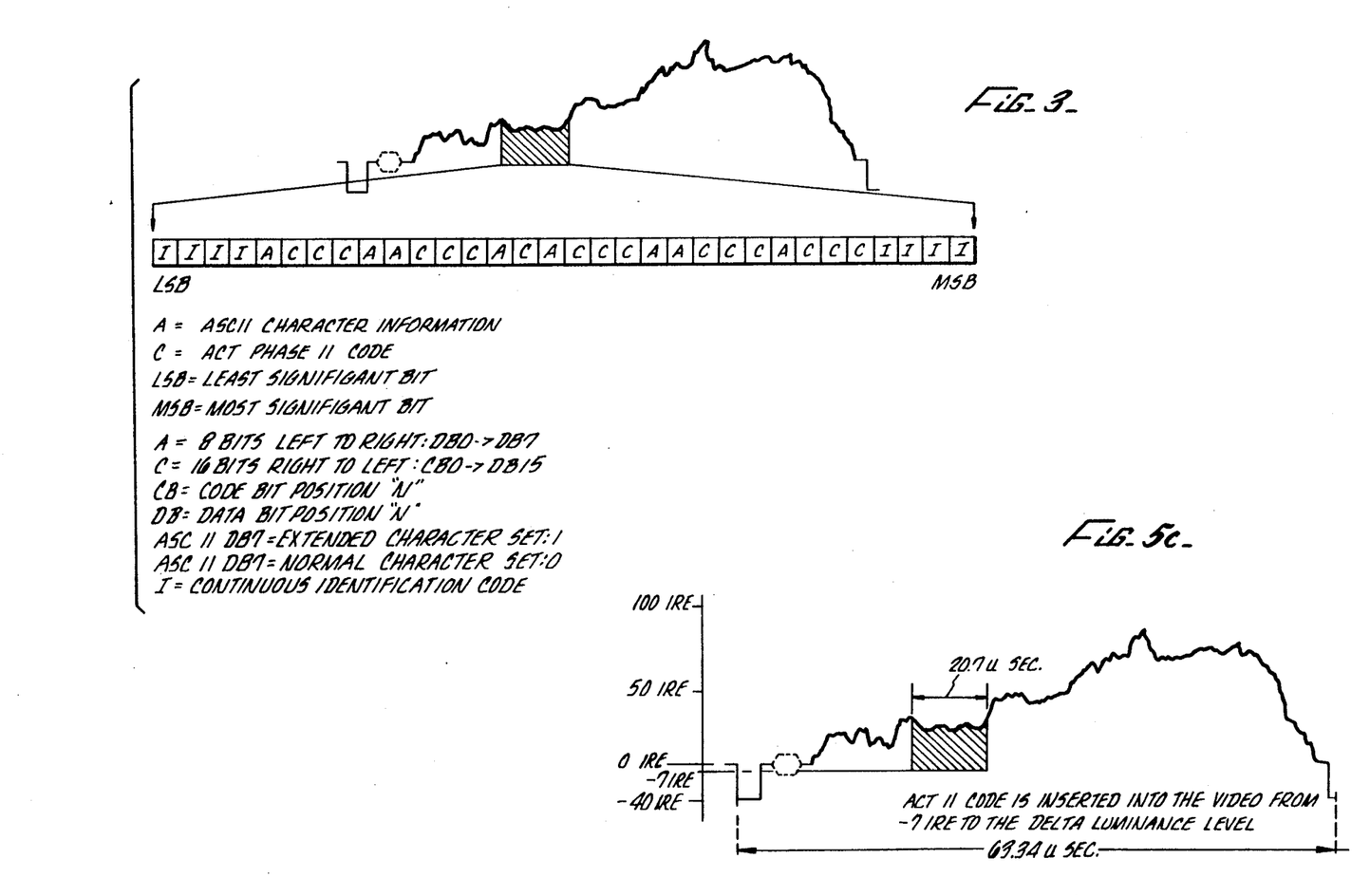
FIG. 3 is a schematic illustration of a stream of data which is inserted into a video signal in accordance with the preferred embodiment.
FIG. 5a, 5b and 5c are illustrations of the form of the signal by which the leading and trailing code sequences are inserted into the video signal.

Turning to FIG. 2, in the preferred embodiment leading and trailing digital code sequences are inserted into the luminance portion of the video signal. The leading and trailing code sequences are each inserted into a portion of corresponding single lines of video information, and are spaced apart from each other by exactly one field. Thus, if the leading code sequence is inserted in line 35, the trailing code sequence is inserted in line 298, i.e., exactly 263 lines (one field) later. While each code sequence will distort the video information in the particular line in which the sequence is inserted, the distortion appears as a dropout and this is not generally regarded as an unacceptable picture defect by consumers. Thus, if encoded video software is played on conventional video playback equipment or recorded by a conventional video recorder, a viewer will not realize that the software is encoded and will merely perceive a certain incidence of dropouts, which are already normally present in the recorded image. In addition, the encoding signal is carried onto the copy where it may affect further attempts to copy at a later date. Further explanation follows on how to minimize the visibility of the encoding signal.

A predetermined coincidence between the leading and trailing code sequences as detected indicates that the video signal represents proprietary video software which may not be legally copied. Accordingly, a separate record inhibit signal is generated to inhibit recordation of the video signal on, e.g., video tape.

In the preferred embodiment, there are two legal regions in which the leading and trailing code sequences may be inserted. The first region is between lines 35 and 81 of the first field, which corresponds to lines 298 through 344 of the second field. The second region is between lines 181 and 227 of the first field, which corresponds to lines 444 through 490 of the second field. This is illustrated in FIG. 2. Thus, where proprietary video software is encoded in accordance with the invention and the leading code sequence is inserted into, say, line 37 (which is in the first field), the trailing code sequence will be found in line 300 (in the second field). Where the leading code sequence is inserted into, say, line 200 (which is in the first field), the trailing code sequence will be found in line 463 (in the second field). In these examples, the determination is then made that matching leading and trailing code sequences are present and the video signal is known to be encoded and to represent proprietary video software. Accordingly, a record inhibit signal is generated to inhibit the recordation (but not the display) of the video signal for a predetermined period, e.g., 10 seconds.

The preferred embodiment uses leading and trailing code sequences for two reasons. First, although it would be theoretically possible to use only one code sequence and to inhibit recordation upon detection of that code sequence, this could potentially cause record inhibitions to take place in the admittedly unlikely case in which the conventional video signal happens to match the sequence. Secondly, by using leading and trailing code sequences and using matching of the code sequences as the criterion for record inhibition, a large number of codes can be used. This makes reverse-engineering substantially more difficult.

As a further "fail-safe" feature, the preferred embodiment uses record inhibition for only a limited period. Should, by some highly unlikely coincidence, (such as atmospheric disturbances during broadcast signals), a record inhibit signal be generated for nonproprietary video software, the effect of this signal will be limited and the entire program will not be rendered unrecordable. In practice, a studio would record leading and trailing code sequences at repeated intervals during the same program, so that recording would be inhibited, e.g., for 10 seconds every 2 or 3 minutes.

While an identification number and ASCII code present in the ACTII code are not utilized in the preferred embodiment, they are provided for future use. For example, the owner of the proprietary video software may wish to cause particular ASCII messages to be displayed on the screen during playback, and may wish to trace the source of illegal copies by determining the identification number on an illegal copy.

Figure 4:
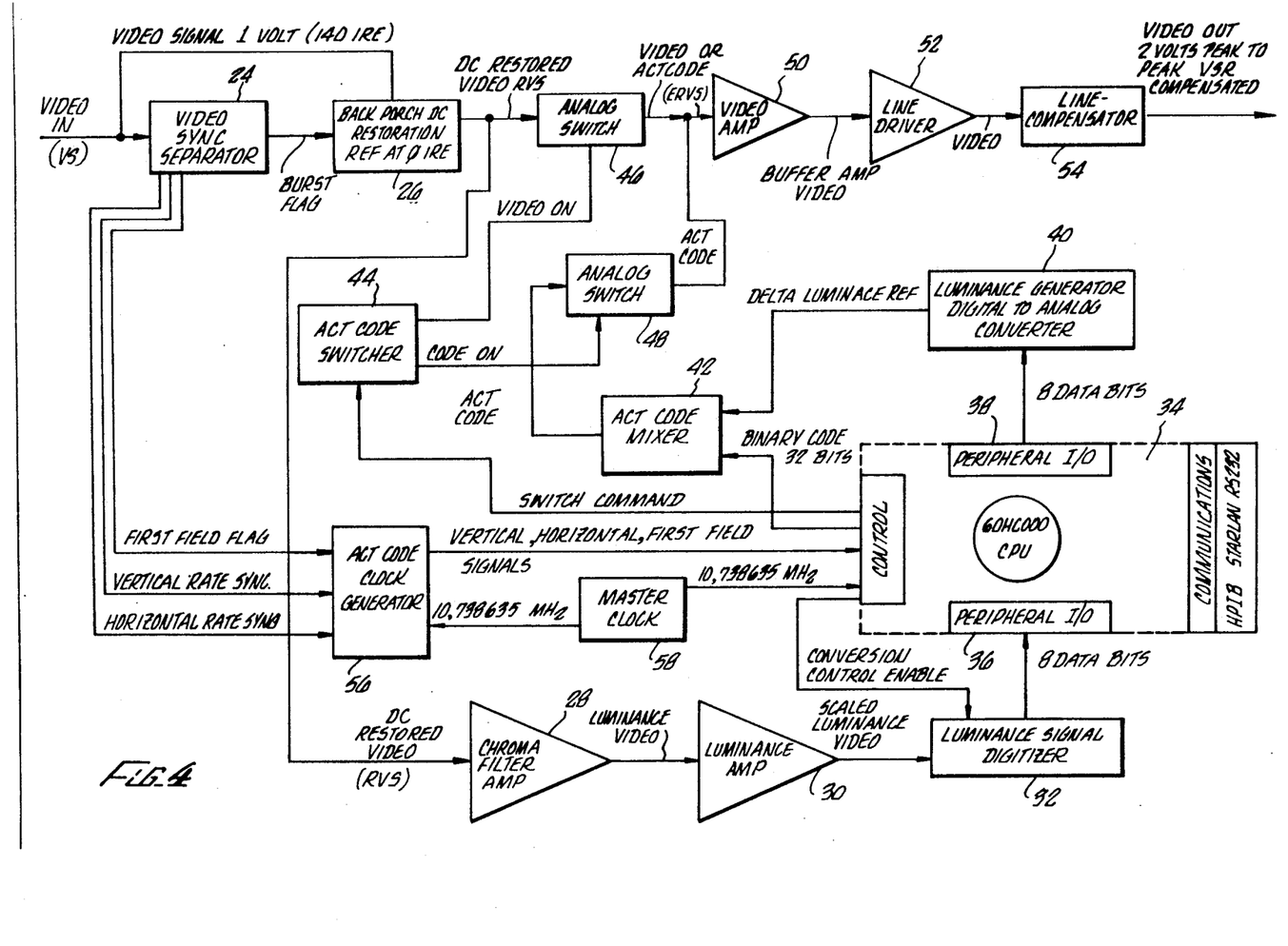
FIG. 4 is a block diagram of an encoder in accordance with the preferred embodiment.

The operation of the encoder 10 will now be explained with reference to FIG. 4. An incoming video signal VS representing proprietary video software is terminated into a 75 ohm resistance (not shown), and the amplitude of the signal VS is the standard 1 volt, measured from −40 IRE to 100% luminance at 100 IRE. The signal VS is then input to two circuits: a video sync separator 24 and a back porch DC restoration circuit 26. The video sync separator 24 extracts synchronization signals so that the remaining circuitry can be synchronized with the incoming signal VS. The back porch DC restoration circuit 26 clamps the burst level in the video signal VS to ground level (0 IRE). This DC restoration process is standard in all video recorders and serves to insure that the luminance displayed on the screen of the monitor corresponds to the luminance which is in the original video signal VS.

The DC restored video signal RVS is then routed along two circuit branches. Along the first branch, which leads rightwardly in FIG. 4 from the back porch DC restoration circuit 26, the DC-restored video signal RVS is directed out of the encoder along a chain of circuits which will be described below. Along the other branch, which leads down and to the right in FIG. 4, the DC-restored video signal RVS is used to identify suitable locations in which the leading and trailing code sequences may be inserted.

In this latter circuit branch, the DC-restored video signal RVS is routed to a chroma filter amplifier 28. The chroma filter amplifier 28 strips all color information from the DC-restored video signal RVS so that only the luminance portion of the signal is left. Next, the remaining luminance information is input to a luminance amplifier 30, which amplifies it to twice the level of a normal video signal. This increases the scale factor to a luminance signal digitizer 32, which is an analog-to-digital converter that digitizes the luminance signal to 8-bit accuracy. The luminance signal digitizer 32 is connected to a CPU 34 through an I/0 port 36.

In the preferred embodiment, the leading code sequence is inserted only into lines which satisfy particular luminance criteria. These criteria are that the average picture level of the previous line must have a luminance between 10 IRE and 45 IRE for 24 microseconds or more. If the average picture level of the previous line has a luminance which is between 10 IRE and 45 IRE for less than 24 microseconds, the leading code sequence is not inserted into the current video line but rather into the next odd field line (and into the corresponding even field line one field later). The code is inserted in binary form between −7 IRE and the average picture level (which will be between 10 IRE and 45 IRE).

Figure 5A:
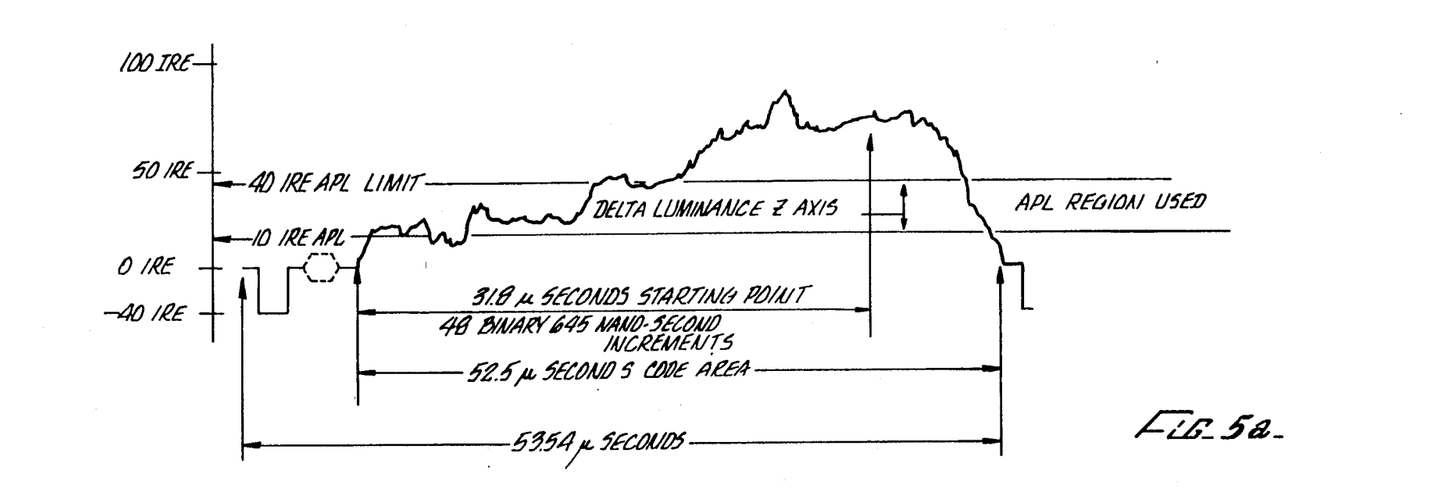
Figure 5B:
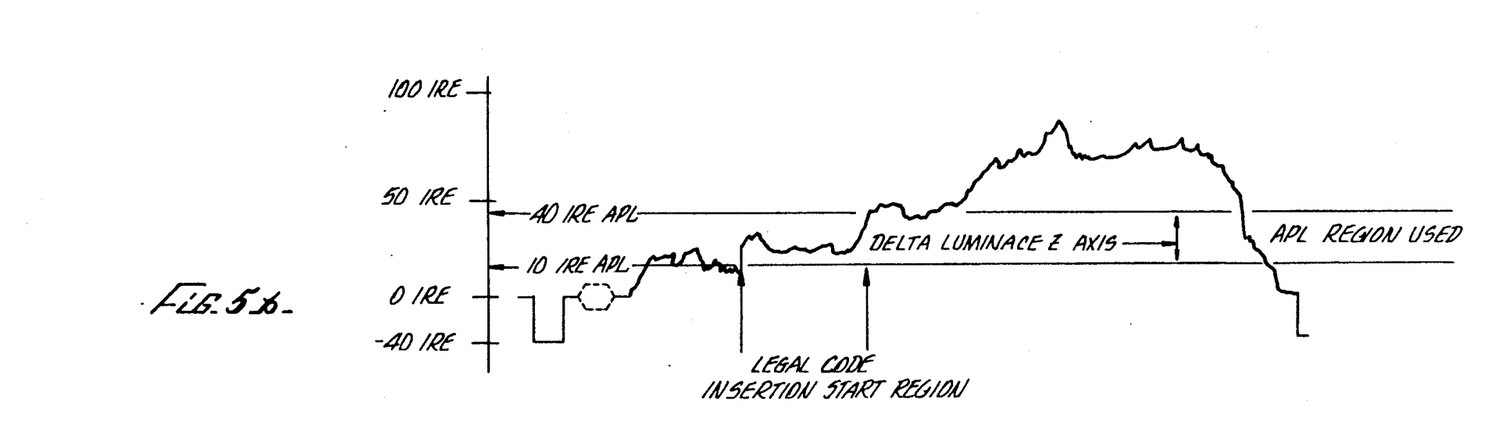

The purpose of qualifying lines by average picture level luminance and duration of luminance is to blend the leading code sequence into the picture as inconspicuously as possible while still insuring a code signal which can be detected and processed. If the luminance of the video line is less than 10 IRE, the amplitude of the resulting digital signal may be insufficient for the decoder circuitry to recognize it. If, on the other hand, the luminance of the video line is greater than 45 IRE, the code will be prominently displayed on the screen. The duration of the code itself is 20.7 microseconds. That duration is chosen because the frequencies generated during code generation have no correlation to any of the harmonics present in broadcast frequencies. The data rate corresponds to the middle of the video spectrum and therefore cannot be easily removed with a notch filter without also removing other essential video information. FIG. 5 illustrates the timing of the insertion of the leading code sequence.

The leading code sequence is not determined in advance but, rather, is calculated based upon an algorithm, which calculates the ACT II code in three variables using the horizontal and vertical position on the screen, and the luminance value for the third condition.

When the leading code sequence has been determined and when the proper insertion line for the leading code sequence has been identified, the CPU 34 outputs the appropriate luminance signals through an I/0 port 38. The luminance signals are then converted to analog form in a digital-to-analog converter 40 and are routed to a code mixer 42 where a 32-bit data stream is mixed with the luminance signal to produce a code sequence in analog form. When the code sequence is to be inserted into the video signal, a code switcher 44 turns an analog switch 46 off and turns an analog switch 48 on. Alternatively, when the code sequence is not to be inserted, the analog switch 46 is turned on and the analog switch 48 is turned off. The encoded restored video signal ERVS is then amplified in a video amplifier 50, which restores any lost amplitude of the video signal From the video amplifier 50 the encoded restored video signal ERVS is passed through a high speed line driver 52 and a line compensator 54 to produce an output signal which is impendence-matched to subsequent transmission or recordation circuitry. Once the leading code sequence has been determined and once its insertion location has been established, the trailing code sequence and insertion location is likewise determined and carried out by the same circuits. In the preferred embodiment, the trailing code sequence is the inversion of the leading code sequence.

The encoder 10 also includes a clock generator 56 and a master clock 58, which clocks the whole encoder 10 as a unit. The master clock 58 operates at 10.738635 MHz. The master clock 58 is used because there is always some fluctuation in the record mechanism of the video recorder, and it is therefore necessary to provide some fixed standard by which the code sequences are inserted into the video signal. The clock generator 56 provides information to the CPU 34 so that the remaining circuitry produces signals which are appropriately timed with respect to the vertical and horizontal sync signals and with respect to the first or second field.

Figure 6:
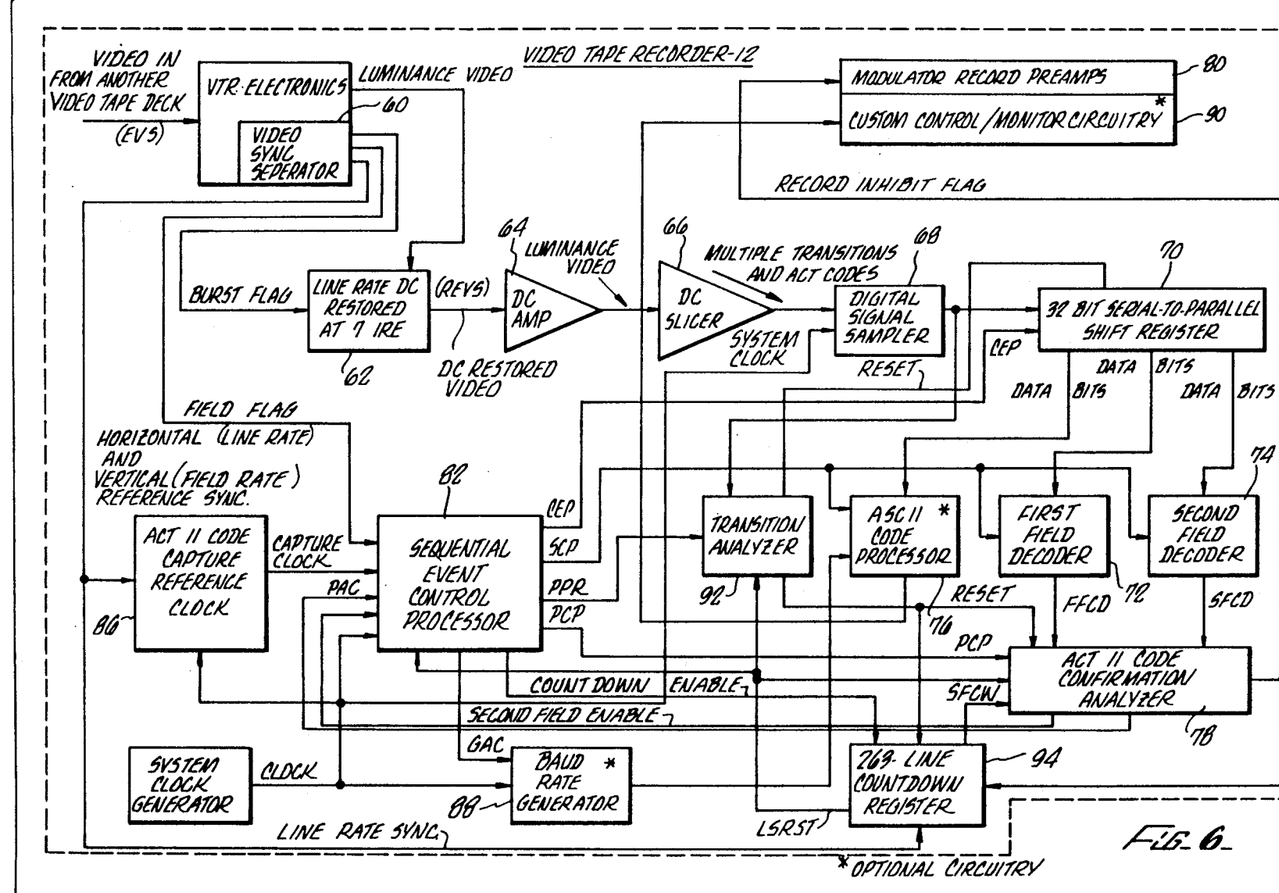
FIG. 6 is a block diagram illustrating circuitry which, in accordance with the preferred embodiment, is added to the circuitry of an otherwise conventional video recorder.

A possible decoder circuit 18 will now be described with reference to FIG. 6. As shown, the decoder circuit 18 is illustrated as installed in an otherwise conventional video recorder, but the recorder is not part of the invention.

The video recorder 12 includes a video sync separator circuit 60 which extracts the horizontal and vertical sync signals, the burst flag and the field flag from the encoded video signal EVS. The encoded video signal EVS is derived from a video tape and appropriate playback circuitry (not shown) which are located elsewhere in the video recorder.

The luminance portion of the encoded video signal EVS and the burst flag from the encoded video signal EVS are then routed to a line rate DC restoration circuit 62. This circuit DC-restores the signal in the same fashion as does the back porch DC restoration circuit 26 described above, but does so with a reference point of 7 IRE rather than 0 IRE.

A DC-restored encoded video signal REVS is produced from the line rate DC restoration circuit 62, which is amplified in an amplifier 64 and then input to a DC slicer 66. The DC slicer 66 detects when the restored encoded video signal REVS crosses 0 volts. The DC slicer 66 is connected to a Digital Signal Sampler circuit 68, which captures the zero-crossings detected by the DC slicer 66 so that it can be determined whether or not such zero-crossings represent code sequences.

The Digital Signal Sampler 68 is connected to a 32-bit serial-to-parallel shift register 70. The shift register 70 separates the output of the Digital Signal Sampler 68 into data bits and ASCII information. Where the data bits relate to the first field, they are stored in a first field decoder 72 and where the data bits relate to the second field, they are stored in a second field decoder 74. Where the contents of the shift register 70 relate to ASCII information, such contents are routed to an optional ASCII code processor 76.

The first field decoder 72 and the second field decoder 74 are connected to a confirmation analyzer 78. When the contents of the first field decoder 72 and the second field decoder 74 match each other in a predetermined way (as, for example, where the leading and trailing code sequences are inversions of each other) the confirmation analyzer 78 indicates the match by generation of a record inhibit signal, which is routed to record circuits 80 in the recorder and which then inhibits operation of the record circuits 80 for a predetermined time, e.g., 10 seconds.

Thus, when the first and second field decoders 72 and 74 contain matched information, this is taken as an indication that the encoded video signal EVS represents proprietary video software and the record function is inhibited for a period of time. When the decoders 72 and 74 contain different information, this is taken as an indication that the video signal is not encoded and therefore represents nonproprietary video software.

The decoder is sequenced by a sequential event control processor 82 which, like all the other circuits, is clocked by a system clock 84. A system clock 84 is provided because the code sequences are asynchronous with respect to the vertical and horizontal sync. The sequential event control processor 82 is synchronized to the incoming encoded video signal EVS by a capture reference clock generator 86, which is connected between the video sync separator 60 and the sequential event control processor 82. The capture reference clock generator 86 is needed because there is always some fluctuation in the playback mechanism of a video recorder and there is therefore always some jitter in the encoded video signal EVS.

The ASCII code is read out of the ASCII code processor 76 by a clock signal generated by a baud rate generator 88, which operates at 1.54 MHz. The code can be utilized by custom control/monitor circuitry 90 to, e.g., cause ASCII messages to be displayed on the video monitor.

The Sequential Event Control Processor 82 generates four phased clock pulses used for signal detection and identification: CEP (Capture Event Pulse), SCP (Scan Code Pulse), PPR (Pre-process Pulse), and PCP (Post Code Pulse); each represents successively delayed pulses, initiated by the leading edge of the capture event clock positive transition. The CEP pulse transfers the Digital Signal Sampler 68 output to the 32-bit Serial-to-Parallel Shift Register 70; the SCP pulse then shifts the parallel binary pattern into both the First and Second Field Decoders 72 and 74 and also to the ASCII Code Processor 76; the PPR pulse signals the Transition Analyzer 92 to monitor for transition in signal level that occur before the PCP pulse and which, therefore, indicate that the data stream does not represent the required code. If any unexpected transitions do occur, a reset signal is generated and the Serial-to-Parallel Register 70, Code Confirmation Analyzer 78, and Sequential Event Control Processor 82 are all returned to reset states. If no unexpected transitions occur, the PCP pulse serves to capture the First Field Code, and, if verified by the Confirmation Analyzer 78, the Second Field Enable pulse is sent to the Sequential Event Control Processor 82, which in turn outputs the Countdown Enable Pulse to the 263-Line Countdown Register 94. This generates a 1-field delayed pulse which is one horizontal line in duration, representing a "window" for the Second-Field Code. If a confirmed Second-Field Code is detected during this "window" (in the same manner as described above), then a Record-Inhibit Flag is generated by the Confirmation Analyzer 78, which also signals the 263-Line Countdown Register Circuit 94 to delay sending a reset signal (LSRST) for a predetermined time period (e.g., 10 seconds); if no Second Field Code is confirmed, then the reset is signalled immediately, and no Record Inhibit Flag is transmitted.

Thus, a bilateral anti-copying system for video systems is disclosed which employs an encoded luminance signal detected by dedicated decoding circuitry. While embodiments and applications of this invention have been shown and described, it will be apparent to those skilled in the art that many more modifications are possible without departing from the inventive concepts herein. The invention, therefore, is not to be restricted except in the spirit of the appended claims.

What is claimed:

1. A method of preventing incoming video information from being recorded by a video tape recorder, comprising the following steps:

monitoring the luminance portion of said incoming video information for presence of a leading code sequence which is in a predetermined format;

upon detection of such a leading code sequence, monitoring the luminance portion of said incoming video information for a trailing code sequence which is in a predetermined format;

upon detection of such a trailing code sequence, comparing said leading code sequence with said trailing code sequence; and inhibiting recording circuitry in said video tape recorder when said leading and trailing code sequences bear a predetermined relationship to each other.

2. The method of claim 1, wherein there is a predetermined relationship between the lines of video information in which said leading and trailing code sequences are contained, wherein the method further comprises the step of identifying lines of video information in which said trailing code sequence must be contained, and wherein said step of monitoring the luminance portion of said incoming video information for said trailing code sequence is carried out during transmission of the luminance portion of said identified lines.

3. The method of claim 1, wherein the leading and trailing code sequences are digital signals.

4. The method of claim 1, wherein said predetermined relationship is that of inversion.

5. The method of claim 1, wherein said inhibiting step is carried out only for a predetermined time.

6. A method for processing a video signal to embed therein information which, when detected by a video recorder, will inhibit recordation of such video signal by such recorder, comprising the following steps:

establishing first and second lines of video information which are spaced one field apart from each other;

recording, in the luminance portion of said first line of video information, a leading code sequence; and recording, in the luminance portion of said second line of video information, a trailing code sequence which bears a predetermined relationship with said leading code sequence.

7. The method of claim 6, wherein said establishing step comprises the following steps:

defining an active region comprising a group of lines in a first field of video information;

monitoring the luminance signal of lines in said active region for the existence of a luminance signal which meets predetermined criteria of luminance for a predetermined period of time; and upon detection of the existence of such a signal, establishing an immediately succeeding line of video information identified as said first line and a corresponding line of video information identified as said second line which is one field later than said first line.

8. The method of claim 7, wherein a first portion of said active region begins with line 35 and ends with line 81.

9. The method of claim 7, wherein a second portion of said active region begins with line 181 and ends with line 227.

10. The method of claim 6, wherein said recording steps are carried out asynchronously with respect to the video synchronization of the video signal.

11. The method of claim 6, wherein the leading and trailing code sequences are digital signals.

12. The method of claim 11, wherein the leading and trailing code sequences are inversions of each other.

13. A circuit for use with a video recorder to inhibit recording operation thereof when recording a video signal which contains corresponding leading and trailing code sequences which are one field apart from each other, comprising:

means for monitoring the luminance portion of said video signal for digital code sequences;

first means for storing a digital code sequence which is detected by said monitoring means;

second means for storing another digital code sequence which is detected by said monitoring means;

means for comparing said digital code sequences which have been stored in said first and second storing means; and means for inhibiting recording operation of the video tape recorder when said comparing means indicates that said digital code sequences have a predetermined relationship with each other.

14. The circuit of claim 13, further comprising means for DC-restoring said video signal, and wherein said monitoring means operates on said video signal after it has been DC-restored.

15. The circuit of claim 13, wherein said monitoring means includes a serial-to-parallel shift register.

16. The circuit of claim 13, wherein said inhibiting means operates to inhibit recording operation of the video recorder only for a predetermined time.

17. A circuit for inserting leading and trailing digital code sequences into a video signal, said sequences being spaced one field apart from each other, comprising:

means for DC-restoring said video signal;)

means for monitoring the luminance portion of said video signal after it has been DC-restored;

means for determining when said luminance portion satisfies predetermined luminance criteria for a predetermined time;

first means for inserting into said DC-restored video signal at the line immediately following a line in which said luminance portion satisfies said criteria for said time, a digital leading code sequence inserted at a level between a predetermined IRE level and the luminance level of said DC-restored video signal;

means for identifying, in said DC-restored video signal, a line which is one field later than said line in which said digital leading code sequence has been inserted; and second means for inserting into said DC-restored video signal at said later line a digital trailing code sequence between said predetermined IRE level and the luminance level of said DC-restored video signal.

18. The circuit of claim 17, wherein said monitoring means monitors a version of said video signal from which all chroma information has been removed.

19. A method of preventing a video signal from being recorded by a video recorder, comprising the following steps:

encoding the luminance portion of said video signal in such a manner that, after said encoding, said video signal appears visually acceptable to a user who displays said video signal on a video monitor;

monitoring said video signal to detect said encoding; and inhibiting recording of said video signal by said recorder upon detection of said encoding.

20. A method of transmitting digital information within an analog signal comprising the steps of generating leading and trailing digital code sequences containing digital information and inserting said code sequences in said analog signal to thereby produce a combined signal, transmitting the combined signal, detecting the leading and trailing code sequences in the transmitted combined signal and comparing the leading and trailing code sequences, extracting said digital information when the leading and trailing code sequences bear a predetermined relationship, and repeating the foregoing steps.

21. A method as in claim 20 wherein the analog signal is the luminance portion of a video signal, said leading and trailing code sequences have a predetermined time relationship, the combined signal is recorded on a video recording medium, the leading and trailing code sequences are detected upon playback of the recorded video signal, and the digital information transmitted is information to prevent video information from being recorded by a video tape recorder.

* * * * *